United States Patent [19]

Heifner et al.

[11] 4,247,026

[45] Jan. 27, 1981

[54] VEHICLE CARGO CONTAINER

[76] Inventors: Robert C. Heifner, 152 Grosvenor St.; Marcus J. Molea, Rte. 3, Box 254 Peach Ridge Rd., both of Athens, Ohio 45701

[21] Appl. No.: 74,792

[22] Filed: Sep. 12, 1979

[51] Int. Cl.³ .......................... B60R 7/00; B60R 9/00; B62D 33/00
[52] U.S. Cl. ................. 224/42.42; 224/328; 296/39 R; 220/410
[58] Field of Search ............... 224/42.42 R, 311, 328; 220/410; 296/39 R

[56] References Cited

U.S. PATENT DOCUMENTS

| | | | |
|---|---|---|---|
| 2,060,362 | 11/1936 | Zurcher | 296/39 R X |
| 2,920,802 | 1/1960 | Cook | 224/328 |
| 3,095,129 | 6/1963 | Kerr | 224/328 |
| 3,132,781 | 5/1964 | Poczatek | 224/42.42 R X |
| 3,915,362 | 10/1975 | Hart | 224/328 |
| 4,111,481 | 9/1978 | Nix et al. | 224/42.42 R X |

*Primary Examiner*—Steven M. Pollard
*Attorney, Agent, or Firm*—Francis T. Kremblas, Jr.

[57] ABSTRACT

A cargo sleeve removably mounted into the cargo area of standard passenger vehicles such as station wagons or the like or which may be removably mounted to the top of the vehicle which is characterized by a container means including a top opening, side walls, front and rear walls and a bottom wall integrally formed with one another to form a receptacle, said side walls having a configuration that closely conforms to the configuration of the walls of a standard vehicle cargo area and a flanged rim surrounding substantially the entire receptacle means. A removably mounted lid portion is included which generally conforms to the configuration of the receptacle and includes edge portions which rest upon a portion of said flanged rim.

4 Claims, 11 Drawing Figures

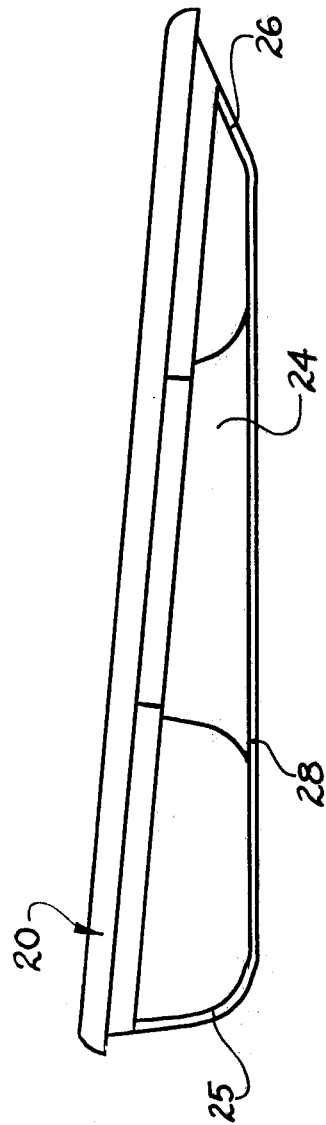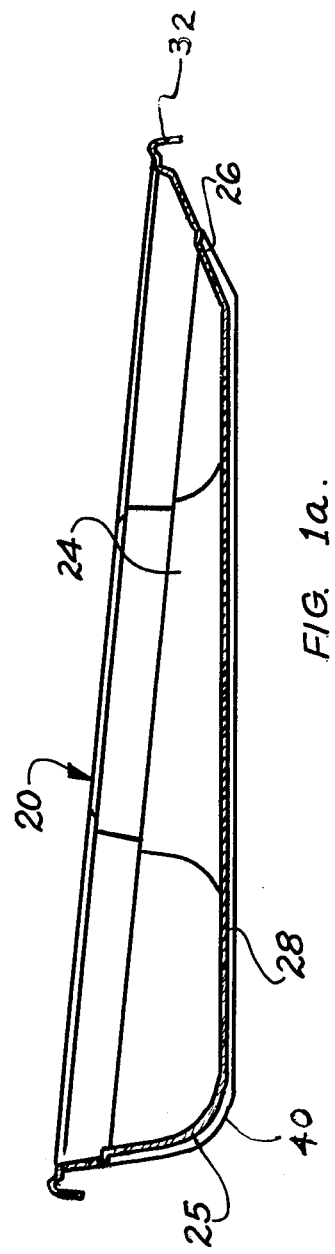

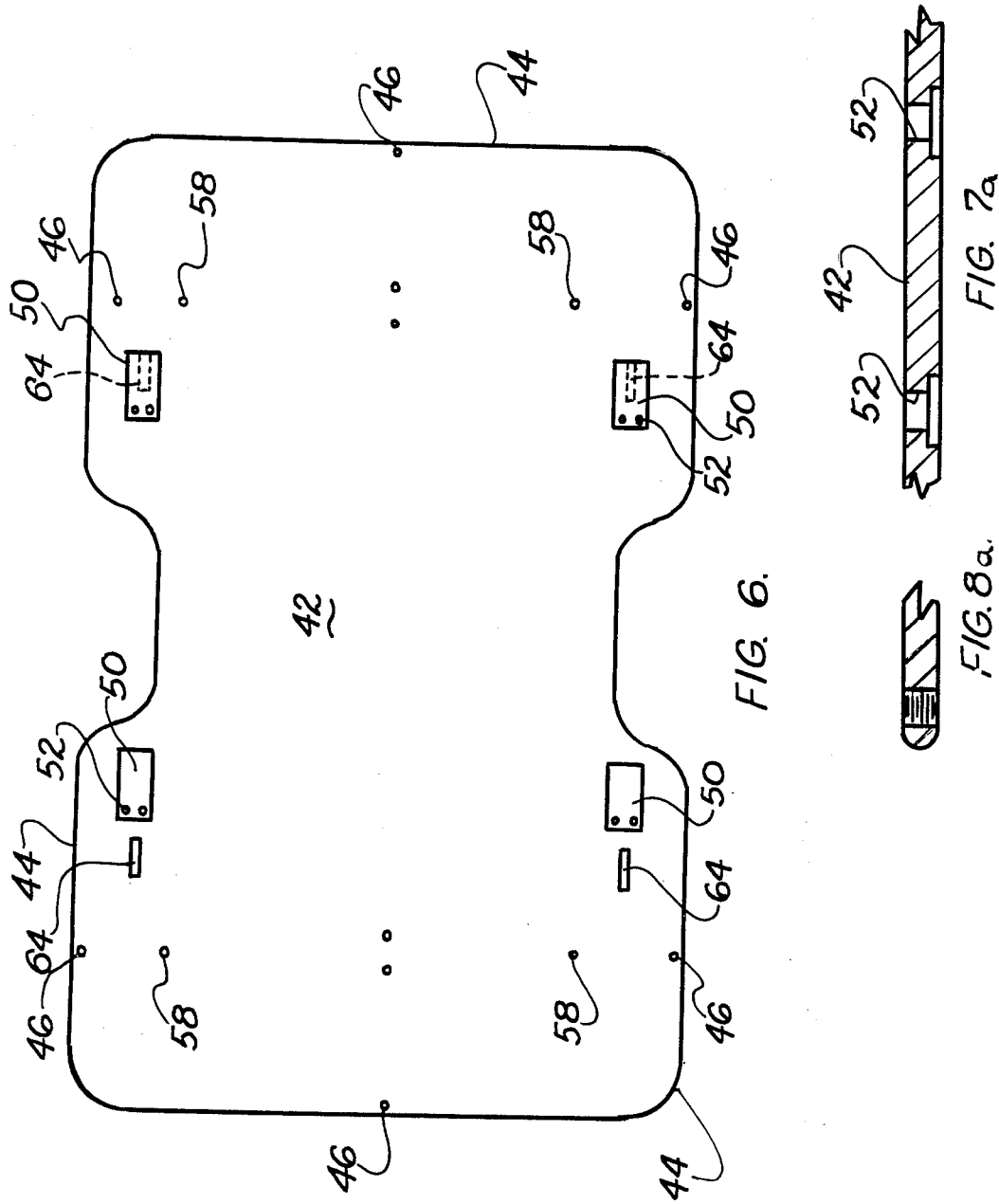

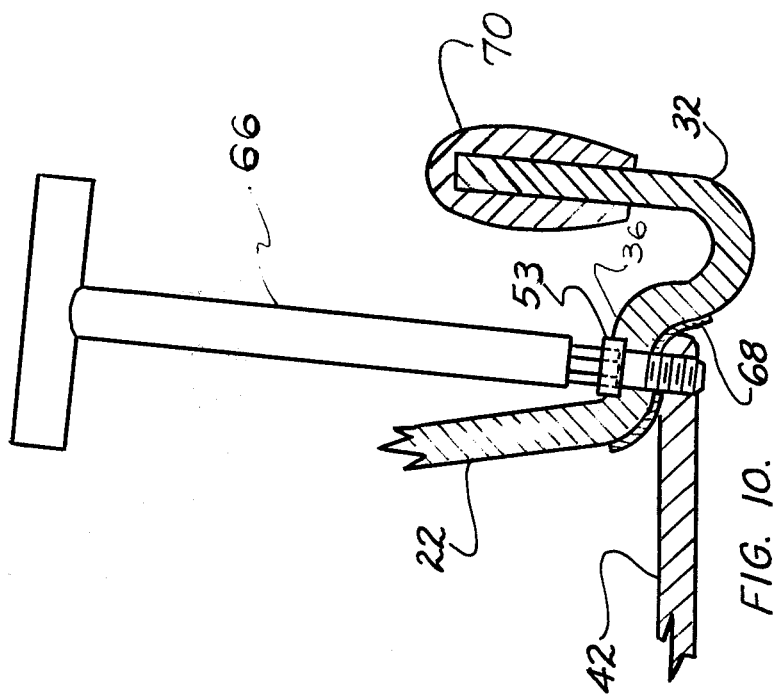
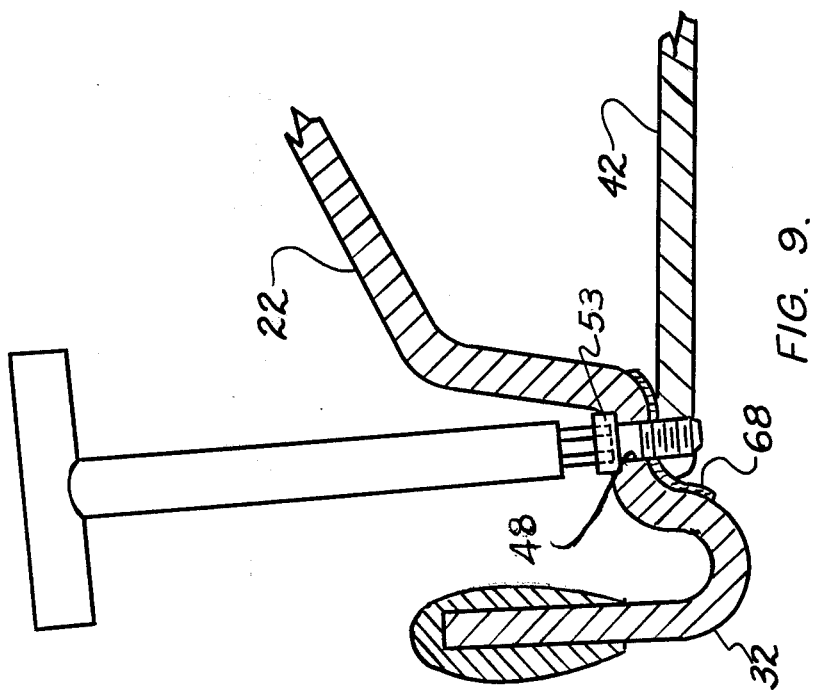

VEHICLE CARGO CONTAINER

BACKGROUND

Vehicles of the station wagon or hatch back type include a cargo area of sufficient size to permit users to transport many various types of items. In today's society, consumers are increasingly cost conscious and therefore are more aware of performing home improvement tasks themselves, and in general, are transporting materials of various types in their own vehicles.

However, many types of such materials or equipment are of a nature that restricts or inhibits their transport without causing damage or stains to the interior of the cargo space. Or they may result in unsightly and difficult to remove accumulations of dirt.

A few such materials would include firewood, ice, rock or stones, raw produce, soil, peat moss, fertilizer, tools or small equipment and the like, as well as any other material that is wet or dirty.

Further, the public's dependence upon vehicular travel for vacations or recreation has always made additional storage space a valuable asset for a vehicle.

Luggage racks have therefore been a relatively popular accessory, however, typically they are limited to storage of items that withstand rain or snow without some form of cover which is cumbersome and less than satisfactorily reliable to provide the desired protection against the elements.

Prior to the present invention, there has been no article which offers a simple, relatively inexpensive solution to either of these problems, much less a solution which offers a single accessory item which is capable of such dual performance in alternative configurations as needed.

SUMMARY OF THE INVENTION

A cargo receptacle for a passenger vehicle which is adapted to function as a cargo sleeve for the cargo area of a standard vehicle or as an enclosed car top storage carrier. The cargo receptacle includes side walls and bottom walls and a top opening which closely conform to the interior cargo area of a given standard vehicle of the station wagon type or like which functions as a sleeve to protect the interior of the vehicle from damage and dirt from materials carried within the receptacle. A removable lid is provided to enclose the receptacle in the cargo sleeve configuration and also uniquely functions as a floor means adapted to be removably attached to the roof of the vehicle to receive the receptacle in a reverse position to form an enclosed cargo carrier for storing luggage or other cargo in a car top configuration. Simple fastening means are included to removably fastened the lid to the receptacle in either configuration as desired.

OBJECTS

It is a primary object to provide an accessory item for station wagon type vehicles which is capable of performing as a container or storage means in the dual configuration of a cargo sleeve adapted to fit the cargo area of the vehicle or as a covered roof top carrier and storage means.

It is another object of the present invention to provide an article of the type described which is of relatively simple and lightweight construction which is easily removably mounted into the cargo area of the vehicle in a cargo sleeve configuration to permit a wide variety of materials to be transported in a safe and convenient manner while protecting the interior of the vehicle from any damage or undue soiling caused by the nature of the materials.

It is another object of the present invention to provide an article of the type described which optionally may be used in the car top carrier configuration to provide additional storage space which is completely covered to protect the contents from adverse weather conditions.

It is still another object of the present invention to provide an article of such dual functions which may be constructed in a relatively simple manner from molded plastic material in an economical manner and yet provide a strong and lightweight construction.

It is yet another object of the present invention to provide an article of the type described which may be converted from one storage cargo configuration to another with a minimum of effort to the user.

IN THE DRAWINGS

FIG. 1 is a side elevational view of the receptacle portion of a cargo container constructed in accordance with the present invention;

FIG. 1a is a sectional view through the centerline of the receptacle shown in FIG. 1;

FIG. 6 is a top plan view of the lid portion which forms a part of the cargo container of the present invention;

FIG. 7a is a partial side elevational view of a portion of an apparatus constructed in accordance with the present invention illustrating the receptacle and lid portions as attached in the car top configuration; and FIG. 8a is a partial side elevational view similar to the view shown in FIG. 7a illustrating the opposing end of the receptacle and lid portions in attached relationship.

FIGS. 9 and 10 are partial sectional views showing the removeably mounted lid portion and cargo sleeve with threaded fasteners.

DETAILED DESCRIPTION

Figure 2:
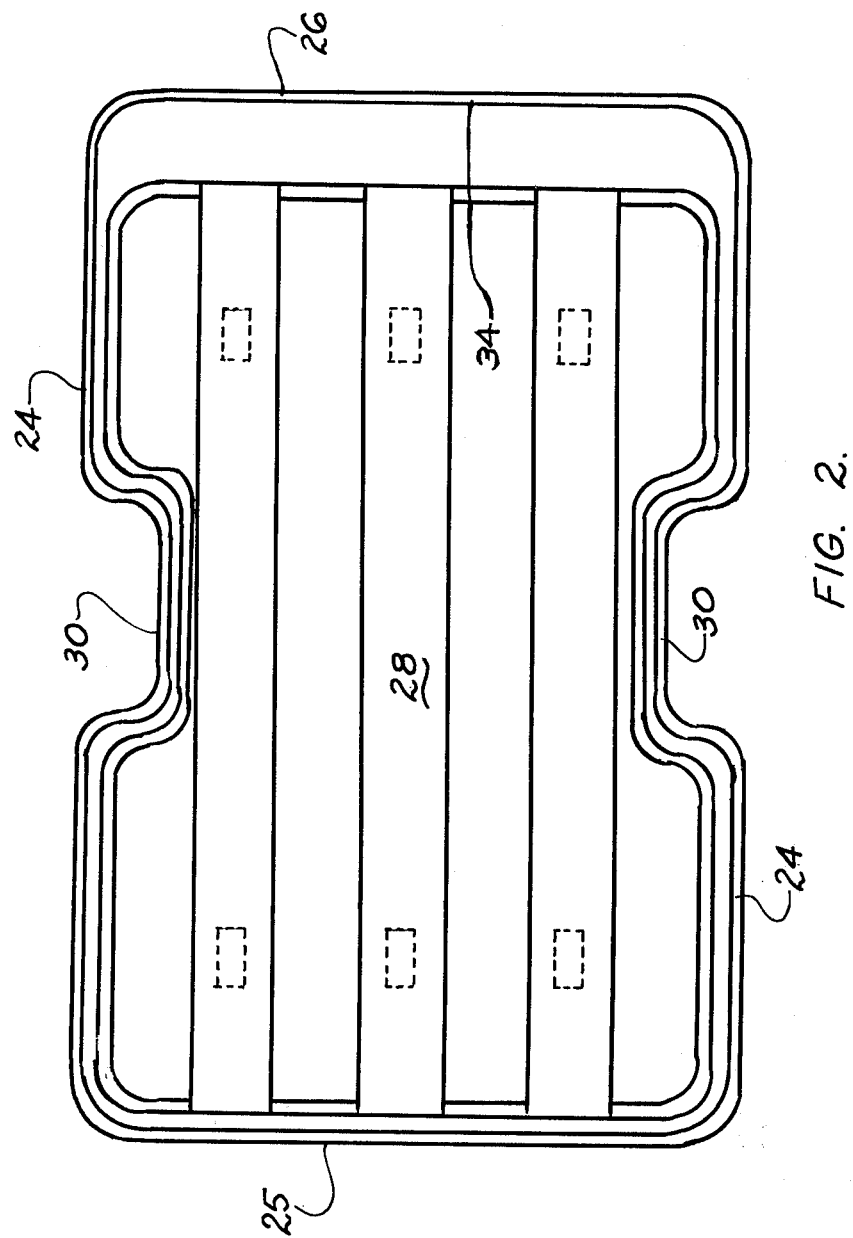
FIG. 2 is a top plan view of the receptacle shown in FIG. 1.

Referring in detail to the drawings, a dual purpose cargo container constructed in accordance with the present invention is illustrated in FIGS. 1 and 2 in the cargo sleeve configuration. The container means indicated generally at 20 includes an integrally formed body portion 22, preferably molded from a strong, yet light plastic material or the like.

Body portion 22 is provided with side walls 24, front wall 25 and rear wall 26 and a bottom wall 28.

The walls means form a storage area generally conforming to the inner dimensions of the cargo area of a given standard vehicle such as a station wagon or hatch-back type vehicle. Side walls 24 are provided with recessed portions 30 which accomodate the tire well of the vehicle which usually extend inwardly into the cargo area. The side walls 24 are preferably high enough to reach upwardly to the lower portion of the windows, however this dimension is optional relative to the designer choice of maximum capacity for the various dimensions of standard vehicles without unduly restricting any necessary vision field of the driver.

The forward wall 26 may be at a higher elevation relative to the rear wall 26. In this manner, the forward end protects the back of the rear seat of the vehicle disposed adjacent thereto, while the lower rear wall affords the user easier access to load or remove articles or materials from the cargo sleeve container. The side walls 24 decrease in height from the front to the rear wall.

A flanged rim 32 completely surrounds the top of the side, front and rear walls to increase stiffness and provide greater structural strength without significantly increasing total weight. The flanged portion of rim 32 provides a convenient surface by which the container may be gripped to facilitate handling the container for transport and removal or replacing it in the vehicle.

Further, the interior surface of side walls 24 and front and rear walls 26 are provided with offset flanges such as at 34 which increase structural strength without porportionally increasing the overall thickness and weight of the product.

Preferably relatively generous radii are provided at all intersecting planes to relieve stress concentration and to increase impact strength, thereby cooperating with the rim and offset flanges to increase strength for any given thickness and weight of the container means.

For similar reasons, bottom wall 28 and front and rear walls 25 and 26 are provided with a plurality of laterally spaced, longitudinally extending ribs 40 to increase the strength and rigidity and control warpage while minimizing the weight and amount of material necessary to form the container means.

As best seen in FIG. 6, a lid portion 42 is provided and may be removably mounted over the top opening of container body 22. The lid 42 is provided with a configuration that generally conforms to the configuration of the top opening of container body 22 and has its outer edges 44 resting upon the flat portion formed by flange 34 which extends around the interior of container 22. As best seen in FIGS. 7a and 8a a plurality of holes 46 are provided which are disposed to register with holes 48 provided at various spaced locations in flange 34 to receive a bolt fastening means such as at 53 to secure lid 42 to container body 22.

Lid portion 42 thereby provides a secure, removable closure which assures that materials or other good being transported can be securely transported to reduce the possibility of spillage during transit. Lid 42 also permits other goods or articles of a less damaging nature to be placed upon the top of lid 42 to be transported while materials of less desirable nature may be carried with container 22.

Of course, lid 42 also in integrally associated and necessary for use of the container body 22 in the car top carrier configuration which is described in detail later herein.

For convenience, a plurality of handles may be provided on the top of lid 42, such as at 50. A single piece of strap material, for example, may be bent over upon itself with the loose ends overlapped and fastened by bolts, rivets or the like through holes such as 52 to form loop-like handles.

Figure 3:
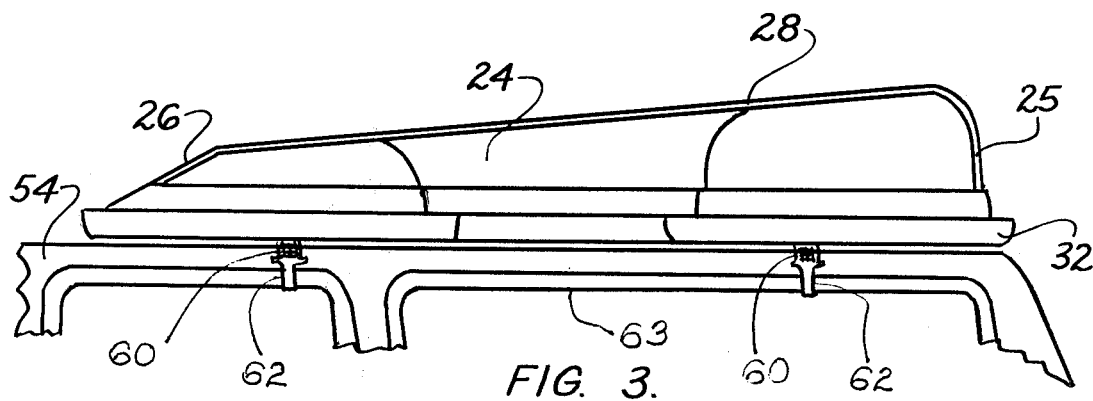
FIG. 3 is a side elevational view of a cargo container constructed in accordance with the present invention shown in the car top carrier configuration.
Figure 4:
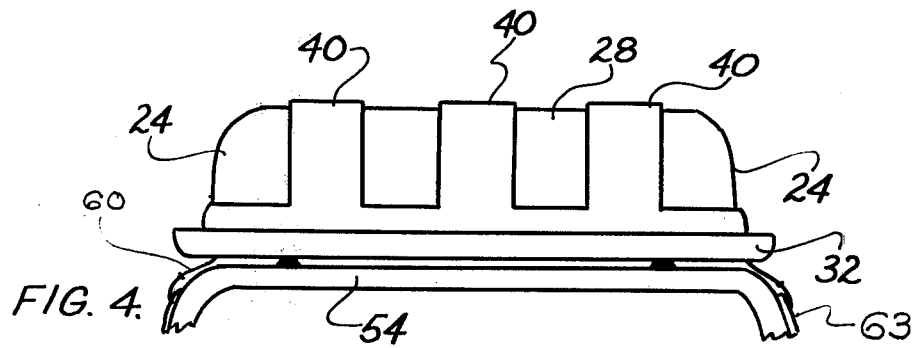
FIG. 4 is a front elevational view of the cargo container shown in FIG. 3.
Figure 5:
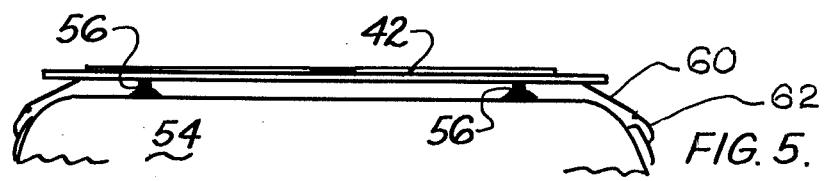
FIG. 5 is a partial front elevational view similar to FIG. 4, illustrating the mounting means employed with the configuration of the container shown in FIG. 3.

Now referring to FIGS. 3-5, container means 20 is shown in the car top storage carrier configuration wherein container wall 28 forms a top portion and rear wall 26 faces forwardly.

Lid 42 now functions as a bottom surface which is removably mounted on the top of vehicle 54.

To assume this configuration, two pairs of conventional suction cups 56 are removably mounted to the forward and rearward portions of lid 42 by threaded fasteners, not shown, disposed through appropriate holes in a mounting plate integrally fixed to the upper portions of cups 56 and through holes 58 provided in lid 42. Bolts may be used to secure the fasteners from the top of lid 42 in conventional manner.

A conventional adjustable car top fastening strap 60 provided with hooks 62 which are conventionally adapted to fit under the standard rain gutter 63 conventionally provided on the vehicles is positioned to secure lid 42 on car top 54. Straps 60 may include a loose end which is threaded through a pair of spaced strap holes 64 provided in lid 42 by entering one strap hole 64 from the bottom and extending it over the top of lid 42 to exit through the opposite hole 64 to the buckle of the adjoining hook 62. A conventional adjustable and fastening buckle, not shown, may be employed on both hooks 62, in order to draw strap 60 tight across lid 42 and to secure its position in a conventional manner wellknown and used in typical car top boat carriers.

Normally two such straps 60 would be sufficient to secure lid 42 on the top of the vehicle however, more could be employed if it was felt necessary to assure the positioning of any given load that was to be transported.

After lid 42 has been secured as described, any contents which are desired to be carried may be placed on top of lid 42. Next, container body 22, in the configuration shown in FIGS. 3-5, is placed over lid 42 and the contents disposed thereon with the edges 44 of lid 42 abutting the flange 34 similar to the positioning of lid 42 as described earlier herein.

Then container body 22 is removably secured to lid 42 via threaded fasteners or the like as previously described relative to the cargo sleeve configuration with the exception that the two parts are in reverse vertical alignment such that body 22 is reversed in position as shown in FIGS. 7 & 8. A tool 66 may be easily employed to fasten the bolts 50 to a mating nut, not shown, positioned on the underside of lid 42 or holes 48 and/or 46 may be provided with suitable threads adapted to receive the fasteners 53.

Upon fastening each of the threaded fasteners 53 to secure the container body 22 to lid 42, the storage car top carrier is complete and read for transport.

In addition to the advantage of being readily convertible as desired to the cargo sleeve configuration earlier described simply by reversing the mounting procedure, it should be readily appreciated that a car top storage carrier is provided which is completely enclosed to protect the contents from adverse weather conditions.

If desired, a sealing means in the form of a piece of weather stripping or the like may be positioned between body 22 and lid 42 which as shown at 68 to assure isolation of the contents from rain, snow or water spray from other vehicles during road travel.

Also, as seen in FIGS. 7a and 8a, an enlarged grip 70 of plastic material may be optionally provided along the flanged portion of rim 32 to increase the comfort of manually carrying container 22 during routine use in moving the container from location to location outside of the vehicle.

From the foregoing description it should now be readily apparent that the present invention provides a strong, yet relatively light weight accessory which offers significant advantages to owners of vehicles of the type described.

It is readily adapted to a dual configuration to increase its utility and drammatically increases the utility of a vehicle to the user as a means for transporting a variety of goods or material which otherwise would be difficult or impossible to transport.

Further, it lends itself to reduce any damage to the interior of such vehicles, while providing this utility, which otherwise may reduce the resale value of the vehicle.

And particularly important under the condition of today's gasoline situation, it is uniquely designed to provide a streamlined configuration as best seen in FIG. 4, in the car top configuration to reduce wind resistance and minimize adverse gas mileage.

What is claimed is:

1. A cargo container for a passenger vehicle which is alternatively removably mounted in a first position as a cargo sleeve closely conforming to the cargo area of a standard vehicle or in a second position on the top roof of the vehicle as a car top storage carrier comprising, in combination, a receptacle means including side walls and a bottom wall provided with a top opening integrally forming a storage area having a predetermined configuration conforming to the cargo area of a predetermined standard passenger vehicle cargo area, said bottom walls including longitudinally extending ribs and said side walls being provided with an inwardly extending lip and an outer flanged rim; and a removably mounted lid portion conforming generally to said top opening and including edge portions adapted to engage said inwardly extending lip to form a closure to said storage area of said receptacle means in either said cargo sleeve or car top carrier configuration.

2. The cargo container defined in claim 1 wherein said side walls of said receptacle means include end walls longitudinally spaced from one another in its normal configuration and said end walls having a different height dimension relative to one another with said side wall portions joining said end walls sloping from the higher to the lower of said end walls.

3. The cargo container defined in claim 1 wherein said inwardly extending lip of said side walls is provided with a plurality of holes spaced at predetermined locations and said edges of said lid portion including a plurality of similar holes disposed at locations registering with said holes in said lip; and removably mounted fastener means extended through at least some of said registered holes to secure said lid portion to said body portion.

4. The cargo container defined in claim 3 wherein said lid portion includes a plurality of pairs of spaced openings and including strap means removably mounted to the roof top of said vehicle and having portions received by said spaced openings in said lid portion to secure said lid portion to the roof top of said vehicle when said cargo container is disposed in the car top storage configuration.

* * * * *